(12) United States Patent
Singh et al.

(10) Patent No.: US 8,320,313 B1
(45) Date of Patent: Nov. 27, 2012

(54) METHOD AND SYSTEM FOR CARRIER FREQUENCY MANAGEMENT BASED ON SLOT CONTENTION

(75) Inventors: Anil Singh, Leawood, KS (US); Jason P. Sigg, Overland Park, KS (US); Ashish Bhan, Shawnee, KS (US); Maulik K. Shah, Overland Park, KS (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 736 days.

(21) Appl. No.: 12/487,849

(22) Filed: Jun. 19, 2009

(51) Int. Cl.
H04Q 7/00 (2006.01)
H04J 3/16 (2006.01)

(52) U.S. Cl. ........................ 370/329; 370/437

(58) Field of Classification Search ............... None
See application file for complete search history.

(56) References Cited

U.S. PATENT DOCUMENTS

| | | | |
|---|---|---|---|
| 5,617,059 A | 4/1997 | Eggleston | |
| 5,796,722 A | 8/1998 | Kotzin et al. | |
| 5,809,398 A | 9/1998 | Moberg et al. | |
| 5,898,382 A | 4/1999 | Treatch | |
| 5,898,681 A | 4/1999 | Dutta | |
| 5,987,304 A | 11/1999 | Latt | |
| 5,995,498 A | 11/1999 | Toot, Jr. et al. | |
| 5,999,816 A | 12/1999 | Tiedemann, Jr. et al. | |
| 6,002,664 A | 12/1999 | Schachter | |
| 6,021,123 A | 2/2000 | Mimura | |
| 6,038,448 A | 3/2000 | Chheda et al. | |
| 6,047,191 A | 4/2000 | Desgagne | |
| 6,088,590 A | 7/2000 | Anderson et al. | |
| 6,119,005 A | 9/2000 | Smolik | |
| 6,132,306 A | 10/2000 | Trompower | |
| 6,289,724 B1 | 9/2001 | Varma et al. | |
| 6,295,453 B1 | 9/2001 | Desgagne et al. | |
| 6,360,098 B1 | 3/2002 | Ganesh et al. | |
| 6,400,951 B1 | 6/2002 | Vaara | |
| 6,404,775 B1 | 6/2002 | Leslie et al. | |
| 6,463,298 B1 | 10/2002 | Sorenson et al. | |
| 6,477,354 B1 | 11/2002 | Roberts et al. | |
| 6,532,221 B1 | 3/2003 | Kim et al. | |

(Continued)

FOREIGN PATENT DOCUMENTS

EP 1294203 3/2002

(Continued)

OTHER PUBLICATIONS

Down and Lewis, "Dynamic Load Balancing in Parallel Queueing Systems: Stability and Optimal Control," Jul. 15, 2004.

(Continued)

Primary Examiner — Hassan Phillips
Assistant Examiner — Eunsook Choi (57) ABSTRACT

Methods and systems for carrier frequency management based on slot contention are provided. A radio access network (RAN) may radiate on one or more carrier frequencies to define wireless coverage areas. Each wireless coverage area may provide network access for one or more wireless communication devices (WCDs). In order to efficiently manage these carrier frequencies, the RAN may measure a slot contention metric for each carrier frequency. Based on the measured slot contention metrics, the RAN may perform a carrier frequency management function affecting at least one of the carrier frequencies. Carrier frequency management functions may include, but are not limited to, assigning a WCD to a carrier frequency, taking a carrier frequency out of service, and placing a new carrier frequency in service.

20 Claims, 10 Drawing Sheets

U.S. PATENT DOCUMENTS

| | | |
|---|---|---|
| 6,535,736 B1 | 3/2003 | Balogh et al. |
| 6,542,741 B2 | 4/2003 | Wallstedt et al. |
| 6,546,248 B1 | 4/2003 | Jou et al. |
| 6,571,284 B1 | 5/2003 | Suonvieri |
| 6,625,132 B1 | 9/2003 | Boettger et al. |
| 6,658,269 B1 | 12/2003 | Golemon et al. |
| 6,690,915 B1 | 2/2004 | Ito et al. |
| 6,697,603 B1 | 2/2004 | Lovinggood et al. |
| 6,735,432 B1 | 5/2004 | Jarett et al. |
| 6,748,215 B1 | 6/2004 | Chen et al. |
| 6,754,196 B1 | 6/2004 | Daane et al. |
| 6,845,245 B2 | 1/2005 | Hunzinger |
| 6,845,248 B1 | 1/2005 | Johnson |
| 6,993,287 B2 | 1/2006 | O'Neill |
| 7,006,797 B1 | 2/2006 | Sullivan et al. |
| 7,024,217 B2 | 4/2006 | Hunzinger |
| 7,035,587 B1 | 4/2006 | Yarkosky |
| 7,046,964 B1 | 5/2006 | Sullivan et al. |
| 7,177,658 B2 | 2/2007 | Willenegger et al. |
| 7,190,937 B1 | 3/2007 | Sullivan et al. |
| 7,228,134 B2 | 6/2007 | Gandhi et al. |
| 7,299,005 B1 | 11/2007 | Yarkosky et al. |
| 7,302,265 B1 | 11/2007 | Chalishazar et al. |
| 7,400,901 B2 | 7/2008 | Kostic et al. |
| 7,480,485 B1 | 1/2009 | Oh et al. |
| 2001/0031621 A1 | 10/2001 | Schmutz |
| 2001/0036837 A1 | 11/2001 | Uistola |
| 2002/0044594 A1 | 4/2002 | Bongfeldt |
| 2002/0045431 A1 | 4/2002 | Bongfeldt |
| 2002/0080743 A1 | 6/2002 | Morita et al. |
| 2002/0183039 A1 | 12/2002 | Padgett et al. |
| 2002/0186710 A1* | 12/2002 | Alvesalo et al. ............... 370/468 |
| 2002/0186749 A1 | 12/2002 | Jones |
| 2003/0073444 A1 | 4/2003 | Kogiantis et al. |
| 2003/0083069 A1 | 5/2003 | Vadgama |
| 2003/0114103 A1 | 6/2003 | Dinkel et al. |
| 2003/0119505 A1 | 6/2003 | Jou et al. |
| 2003/0176192 A1 | 9/2003 | Morimoto et al. |
| 2003/0224733 A1 | 12/2003 | Schwarz et al. |
| 2004/0005890 A1 | 1/2004 | Holma et al. |
| 2004/0102167 A1 | 5/2004 | Shim et al. |
| 2004/0106408 A1 | 6/2004 | Beasley et al. |
| 2004/0204097 A1 | 10/2004 | Scheinert et al. |
| 2004/0213182 A1 | 10/2004 | Huh et al. |
| 2005/0075125 A1 | 4/2005 | Bada et al. |
| 2005/0096053 A1 | 5/2005 | Liu et al. |
| 2005/0148368 A1 | 7/2005 | Scheinert et al. |
| 2005/0164709 A1* | 7/2005 | Balasubramanian et al. 455/453 |
| 2005/0227619 A1 | 10/2005 | Lee et al. |
| 2006/0013182 A1* | 1/2006 | Balasubramanian et al. 370/343 |
| 2006/0047842 A1* | 3/2006 | McElwain ................... 709/231 |
| 2006/0142051 A1 | 6/2006 | Purnadi et al. |
| 2006/0160551 A1 | 7/2006 | Matoba et al. |
| 2006/0234719 A1 | 10/2006 | Demirhan et al. |
| 2007/0053336 A1 | 3/2007 | Petrovic et al. |
| 2008/0165733 A1* | 7/2008 | Xiao et al. .................... 370/330 |
| 2009/0191862 A1* | 7/2009 | Amirijoo et al. .............. 455/424 |
| 2011/0142009 A1* | 6/2011 | Lindoff et al. ................ 370/332 |

FOREIGN PATENT DOCUMENTS

| | | |
|---|---|---|
| WO | 98/53621 | 11/1998 |
| WO | 2005/011150 | 2/2005 |
| WO | WO 2006/052759 | 5/2006 |

OTHER PUBLICATIONS

U.S. Appl. No. 11/073,556, filed Mar. 7, 2005.
U.S. Appl. No. 11/131,713, filed May 18, 2005.
Vondemkamp et al., U.S. Appl. No. 11/535,870, filed Sep. 27, 2006, 29 pages.
Office Action for U.S. Appl. No. 11/257,661 dated May 2, 2008, 9 pages.
Adams, S., "The Demands on In-Building Solutions—Using smart antennas and adaptive techniques to improve in building technique," Wireless Business & Technology Magazine, May 20, 2003, 4 pages.
Spotwave Wireless, Inc., SpotCell 112 (PCS-CDMA), "Product Overview," www.spotwave.com, 2003, 2 pages.

* cited by examiner

REVERSE LINK ACTIVITY TO SLOT
CONTENTION MAPPING TABLE
380

| REVERSE LINK ACTIVITY (RANGE) | SLOT CONTENTION |
|---|---|
| 1-2 ACTIVE WCDs | 1 |
| 3-4 ACTIVE WCDs | 2 |
| 5-8 ACTIVE WCDs | 3 |
| 9-16 ACTIVE WCDs | 4 |

METHOD AND SYSTEM FOR CARRIER FREQUENCY MANAGEMENT BASED ON SLOT CONTENTION

BACKGROUND

In a wireless communication system, a radio access network (RAN) may radiate on multiple carrier frequencies to define multiple wireless coverage areas. Each carrier frequency may define a wireless coverage area, or multiple carrier frequencies may, in combination, define a wireless coverage area. The RAN may assign wireless communication devices (WCDs) to one of the wireless coverage areas so that these WCDs can communicate (e.g., access the Internet or other networks) via the wireless communication system. More than one WCD may use each wireless coverage area. Furthermore, since each wireless coverage area may use a different carrier frequency, different WCDs may be able to simultaneously communicate via different wireless coverage areas without interfering with one another.

The multiple wireless coverage areas may physically or geographically overlap to some extent. Thus, when the RAN assigns a WCD to a carrier frequency so that the WCD can communicate, the RAN may have two or more candidate carrier frequencies to choose from. Current carrier frequency assignment techniques may attempt to balance the total number of WCDs per carrier frequency. However, such a simple carrier frequency assignment technique can result in the load on across all available carrier frequencies in a given physical or geographical region being unbalanced. In other words, the actual load on some carrier frequencies may be much higher than the actual load on other carrier frequencies, even if the total number of WCDs on each carrier frequency is roughly the same.

An unbalanced load across the carrier frequencies of a RAN can have a deleterious impact on the performance of the RAN, as some WCDs may be unable to acquire a reasonable amount of communication capacity. This, in turn, may result in the users of these WCDs becoming frustrated with their service. Ultimately, this frustration may impact the revenue of a wireless network operator that provides service via the RAN.

Overview

Methods and systems with which a RAN can manage a set of carrier frequencies are presented. A RAN may radiate to define two or more physically or geographically overlapping carrier frequencies. Each carrier frequency may support a forward link, for communication from the RAN to WCDs, and/or a reverse link, for communication from WCDs to the RAN. Furthermore, the forward links may both operate in accordance with time-division multiplexing (TDM). Thus, the forward links may be divided into TDM slots, and the RAN may transmit data to at least one WCD during each forward link TDM slot.

These methods and systems involve calculation of a slot contention metric for each carrier frequency in the set. Based on a comparison of at least some of these slot contention metrics, the RAN may choose a carrier frequency upon which to perform a management function. Examples of carrier frequency management functions include, but are not limited to, assigning a WCD to a carrier frequency, taking one of the carrier frequencies in the set out of service, and placing a new carrier frequency in service.

The slot contention metric for a given carrier frequency may be defined as the number of active WCDs that (1) are assigned to the given carrier frequency and (2) are awaiting at least one data packet that is queued in the RAN. Thus, the slot contention metric estimates the utilized capacity of the given carrier frequency's forward link. The RAN may assign a WCD to use the carrier frequency in the set that has the lowest slot contention. Balancing load in this fashion may result in better performance than balancing load based on the number of WCDs per carrier frequency, because the actual load for each carrier frequency is taken into account.

Further, measured slot contention metrics can also be used for other carrier frequency management functions. For example, if the RAN determines that the slot contention metrics of a substantial number of carrier frequencies in the set are above a first threshold, the RAN may determine that it would be beneficial to place a new carrier frequency in service. This new carrier frequency may be added to the set, and the RAN could use it to offset the relatively high loads on the other carrier frequencies. Also, if the RAN determines that the slot contention metrics of a substantial number of carrier frequencies in the set are below a second threshold, the RAN may determine that it would be beneficial to remove one of the carrier frequencies in the set from service, and from the set. In doing so, the RAN potentially saves the wireless network operator the expense of powering and managing the removed carrier frequency.

Accordingly, in a first example embodiment, a RAN radiates on a first carrier frequency to define a first forward link, and the RAN radiates on a second carrier frequency to define a second forward link. The RAN may serve one or more WCDs with each of the first and second forward links. The RAN may determine a first slot contention metric for the first forward link, and a second slot contention metric for the second forward link. Based the first slot contention metric and the second slot contention metric, the RAN may perform a carrier frequency management function. For example, the RAN may assign a WCD to the carrier frequency with the lowest slot contention metric, take one of the carrier frequencies out of service, or place a third carrier frequency in service.

In some situations, a RAN may not be arranged to directly measure slot contention for all carrier frequencies that it supports. However, slot contention may be able to be estimated based on other aspects of carrier frequency utilization that the RAN can measure. For instance, the RAN may measure reverse link activity factors for carrier frequencies, and use these factors to estimate the slot contention of each associated forward link.

Accordingly, in a second example embodiment, a RAN radiates on a plurality of carrier frequencies. Each carrier frequency of the plurality may include a forward link and a reverse link. The RAN measures a first series of reverse link activity factors on a first carrier frequency and a second series of slot contention metrics on the first carrier frequency. Then, the RAN determines a mapping between the measured reverse link activity factors in the first series and the measured slot contention metrics in the second series. The RAN may then be able to estimate, based on the mapping and a carrier frequency's reverse link activity factor, the carrier frequency's forward link slot contention metric.

In view of this ability, the RAN may measure a second series of reverse link activity factors on a second carrier frequency, and then, based on the mapping and the second series, the RAN may determine a given forward link slot contention metric for the second carrier frequency. Responsive to determining the given slot contention metric, the RAN may perform a carrier frequency management function affecting at least one of the carrier frequencies of the plurality of carrier frequencies. For example, the RAN may assign a WCD to the carrier frequency with the lowest slot contention metric, take one of the carrier frequencies out of service, or place a new carrier frequency in service.

These and other aspects and advantages will become apparent to those of ordinary skill in the art by reading the following detailed description, with reference where appropriate to the accompanying drawings. Further, it should be understood that the foregoing overview is merely exemplary and is not intended to limit the scope of the invention as claimed.

DESCRIPTION

In accordance with example embodiments, methods and systems for carrier frequency management based on slot contention are presented. A RAN may perform carrier frequency management functions based on a comparison of measured slot contention metrics for one or more carrier frequencies.

I. SYSTEM ARCHITECTURE

Figure 1:
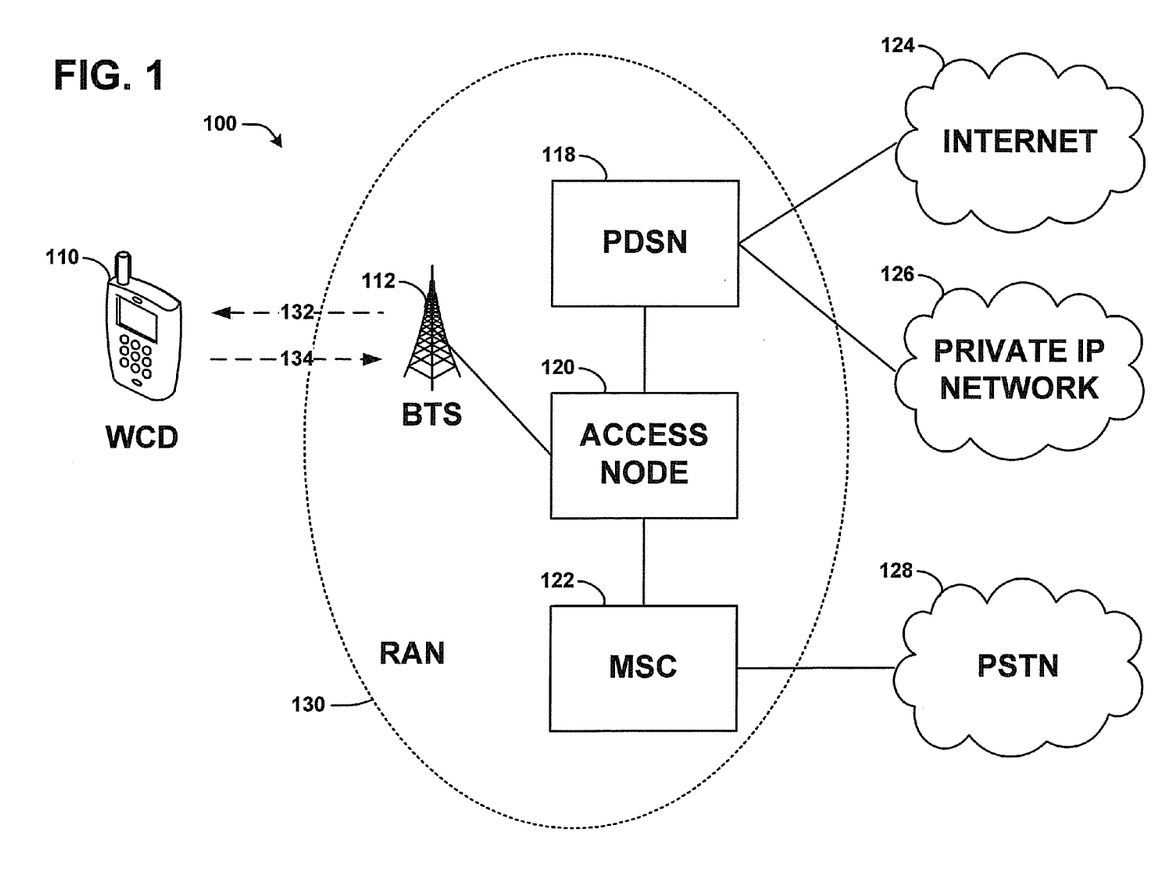
FIG. 1 depicts a wireless communication system in accordance with an example embodiment.

FIG. 1 is a simplified block diagram of example communication network 100, in which example embodiments may be employed. Network 100 may include a base transceiver station (BTS) 112 that can communicate with a WCD 110 via a plurality of wireless coverage areas. WCD 110 could be a wireless telephone, wireless personal digital assistant, wirelessly equipped laptop computer, wireless router, or other type of mobile or fixed wireless device.

BTS 112 may radiate to define the wireless coverage areas. Each wireless coverage area may provide air interface access to WCD 110 and any other WCDs served by the wireless coverage area. A single BTS may define one or more wireless coverage areas. The air interface may include a forward link 132, supporting communication from BTS 112 to WCDs, and/or a reverse link 134, supporting communication from WCDs to BTS 112. WCDs may exchange signaling, voice, data, video, or other media with BTS 112 through the forward and reverse links. In this regard, the WCDs may use the wireless coverage areas defined by BTS 112 to communicate with one or more endpoints. These endpoints may include other WCDs, e-mail servers, world wide web servers, gaming servers, media servers, media gateways, and/or location-based services. The communication may occur via a packet-switched network (e.g., the Internet 124 or private IP network 126), and/or a circuit-switched network, such as the public switched telephone network (PSTN) 128.

As an illustrative example, BTS 112 may be communicatively coupled to an access node 120. Access node 120 may comprise a base station controller (BSC), a radio network controller (RNC), and/or a similar type of device. Access node 120 may, in turn, be communicatively coupled to packet-switched networks 124, 126 via a packet data serving node (PDSN) 118. Alternatively or additionally, access node 120 may be communicatively coupled to PSTN 128 via a mobile switching center (MSC) 122. However, MSC 122 may be integrated with, or replaced by, an IP multimedia subsystem (IMS) infrastructure. Access node 120 may also communicate with PSTN 128 via a media gateway (not shown) that bridges Internet 124 or private IP network 126 to PSTN 128.

Although FIG. 1 shows only one BTS, network 100 may include more than one BTS. Each BTS may be communicatively coupled to access node 120 or to other network elements that are communicatively coupled to packet-switched networks 124, 126 and/or PSTN 128. Furthermore, WCD 110 may be able to transfer ongoing communication sessions from one BTS to another in a handoff process. Additionally, WCD 110 may also be handed off between two wireless coverage areas defined by the same BTS. Network 100 may also include multiple access nodes, PDSNs, and MSCs.

The combination of network elements including BTS 112, access node 120, PDSN 118, and MSC 122 may be collectively referred to as a RAN, and these elements are designated as components of RAN 130. However, RAN 130 may also be defined to comprise more or fewer elements. For example, RAN 130 may comprise multiple BTSs and/or access nodes. Furthermore, these elements may be combined with one another; for example, some combination of a BTS, an access node, a PDSN, and an MSC may be physically co-located or may be logical components of the same physical element.

The entity or entities of RAN 130 preferably include at least one processor, data storage, and program instructions stored in the data storage and executable by the processor to carry out RAN functions described herein. Similarly, a WCD preferably includes at least one processor, data storage, and program instructions stored in the data storage and executable by the processor to carry out WCD functions. Furthermore, the WCDs and RAN 130 may operate and communicate with each other in accordance to various types of wireless protocols, such as Code Division Multiple Access (CDMA), Worldwide Interoperability for Microwave Access (WIMAX®), Universal Mobile Telecommunications System (UMTS), Long Term Evolution (LTE®), IEEE 802.11 (WIFI®), or other protocols now known or later developed.

It should be understood that any communications described herein as being between a WCD and a RAN may take place between a WCD and any component of a RAN. For example, these communications could take place between WCD 110 and access node 120, or between WCD 110 and BTS 112. Each wireless coverage area defined by BTS 112, or other BTSs not shown, may serve multiple WCDs. Each wireless coverage area defined by a given BTS may be defined using a different carrier frequency, thus enabling the BTS to serve a potentially large number of WCDs.

Figure 2:
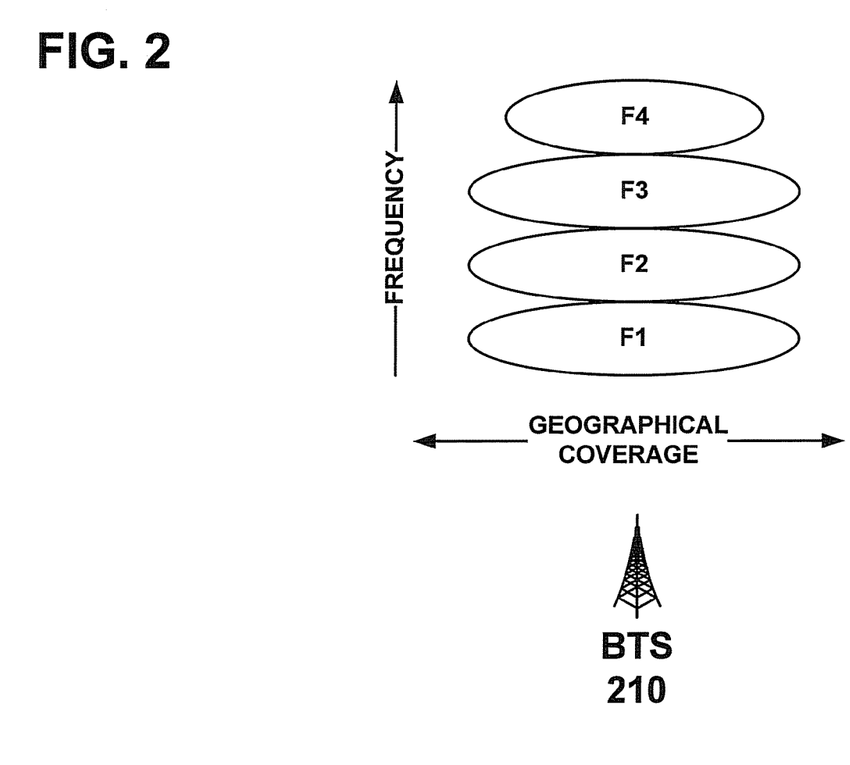
FIG. 2 depicts a number of wireless coverage areas operating at various carrier frequencies in accordance with an example embodiment.

FIG. 2 depicts four wireless coverage areas defined by BTS 210, each defined using one of carrier frequencies F1, F2, F3, and F4. Preferably, these carrier frequencies are separated by sufficiently large guard bands so that BTS 210 can communicate simultaneously with WCDs on each carrier frequency without substantial inter-carrier interference. As depicted in FIG. 2, carrier frequency F1 may be a lower frequency than carrier frequency F2, carrier frequency F2 may be a lower frequency than carrier frequency F3, and carrier frequency F3 may be a lower frequency than carrier frequency F4. However, other arrangements are possible without departing from the spirit of the embodiments herein.

It should be understood that each wireless coverage area defined by a given BTS may be of a different size and/or shape. For instance, as depicted in FIG. 2, the wireless coverage area defined by BTS 210 on carrier frequency F4 may be smaller than the other wireless coverage areas defined by BTS 210. A wireless network operator may choose the number of wireless coverage areas for a given BTS, and the size of each wireless coverage area, based on the wireless network traffic expected or observed near the given BTS. Generally speaking, BTSs located in or near a physical location with a high population density may be arranged to define a relatively large number of wireless coverage areas, while BTSs located in or near a physical location with a low population density may define a relatively small number of wireless coverage areas. Thus, with four wireless coverage areas, BTS 210 may be in a densely populated area exhibiting a large number of WCDs that generate a large amount of total wireless network traffic. However, if BTS 210 were in a sparsely populated area exhibiting a smaller number of WCDs, then BTS 210 might be arranged to define only one or two wireless coverage areas.

While some WCDs may use only one carrier frequency at a time, other WCDs may be arranged to simultaneously utilize multiple carrier frequencies that combine to form a logical wireless coverage area. In this way, such a WCD may be able to communicate at higher data rates by using the capacity of more than one carrier frequency. For example, if the maximum data rate available to a WCD on any one carrier frequency is 1.2 megabits per second, then the WCD may be able to achieve a maximum data rate of 2.4 megabits per second by using two carrier frequencies. CDMA EVDO revision B technologies, as well as other wireless network technologies, may allow the use of multiple carrier frequencies per WCD.

II. FORWARD LINK SLOT CONTENTION

The forward links of wireless coverage areas may operate according to TDM. Thus, for each forward link, a given quantum of time, known as a cycle, may be divided into a number of logical slots. The RAN may transmit part of one or more packets during such a slot. In order to accommodate the bursty nature of network traffic, the RAN may schedule incoming packets (packets that arrive at the RAN from correspondent nodes and are destined for WCDs served by the RAN) to be transmitted to WCDs according to various methods of allocating these slots to WCDs.

For instance, the RAN may allocate a fixed number of forward link slots of a given carrier frequency to each WCD that is using the carrier frequency. Alternatively, the RAN may allocate forward link slots to WCDs dynamically based on some combination of (1) the number of packets destined to the WCD that are queued at the RAN, (2) the absolute or relative priorities of these packets, (3) an absolute or relative priority associated with the WCD, (4) an estimation of the WCD's quality of wireless coverage, and/or (5) other factors. It should be understood that different RANs may be configured to perform forward link slot allocation in different manners, and that any of these configurations may be utilized with the embodiments herein.

Figure 3A:
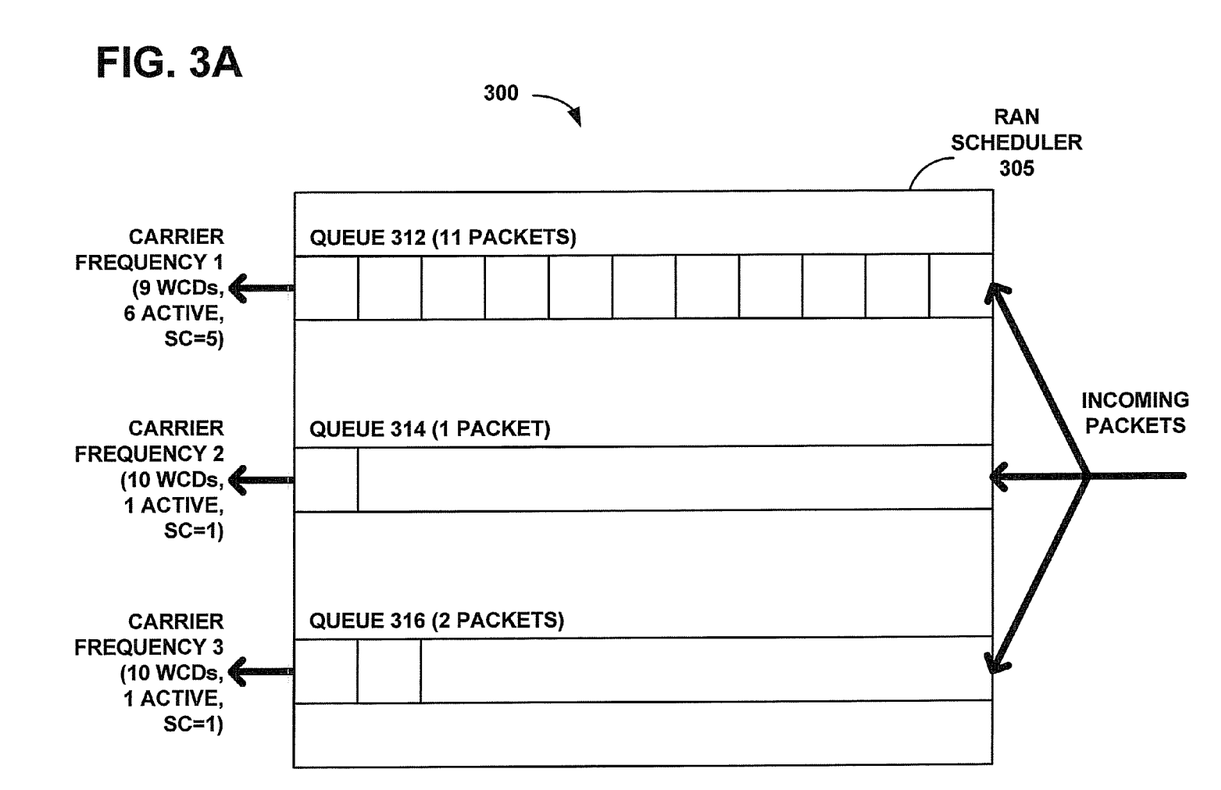
FIGS. 3A-3D depict queue occupancy and slot contention per carrier frequency in accordance with an example embodiment.

FIGS. 3A-3D are block diagrams illustrating various aspects of forward link slot allocation and the assignment of WCDs to carrier frequencies. FIG. 3A is a block diagram 300 representing a RAN scheduler 305 for a RAN that radiates on three different carrier frequencies. RAN scheduler 305 supports (1) receiving incoming packets that are destined to various WCDs served by the RAN, (2) placing these packets into a queue that is associated with the carrier frequency to which each packet's destination WCD is assigned, and (3) scheduling the transmission of these packets to WCDs.

In particular, RAN scheduler 305 may receive a given incoming packet from a network, such as the Internet 124 or private IP network 126. RAN scheduler 305 may examine a destination indicator associated with the given incoming packet, such as a destination IP address, and determine, from this destination indicator, a given WCD to which the given incoming packet is destined. Then, RAN scheduler 305 may place the given incoming packet in a queue associated with the carrier frequency that is serving the given WCD. For instance, in FIG. 3A, RAN scheduler 305 supports one queue per carrier frequency. Queue 312 is associated with carrier frequency 1, queue 314 is associated with carrier frequency 2, and queue 316 is associated with carrier frequency 3. Thus, if the given WCD is served by carrier frequency 3, RAN scheduler 305 may place the given incoming packet into queue 316. RAN scheduler 305 would then determine when to transmit the given incoming packet on carrier frequency 3 to the given WCD.

In FIG. 3A, carrier frequency 1 serves 9 WCDs, while carrier frequency 2 and carrier frequency 3 each serve 10 WCDs. However, 6 of the 9 WCDs served by carrier frequency 1 are active, whereas only 1 WCD served by each of carrier frequencies 2 and 3 is active. (As described below, an "active" WCD may be assigned forward link and/or reverse link resources, and therefore be capable of communicating with the RAN on the forward link and/or the reverse link.) Even though the number of WCDs per carrier frequency is substantially balanced, queue 312 is at maximum capacity, containing 11 packets, while queue 314 contains only one packet and queue 316 contains two packets. This scenario exemplifies a potential problem associated with balancing the number of WCDs per carrier frequency; that is, one or more WCDs served by the same carrier frequency may be receiving large amounts of data at the same time. Thus, the queues associated with some carrier frequencies may be full while the queues associated with other carrier frequencies may be empty or close to empty.

When a queue is full, RAN scheduler 305 may be unable to store incoming packets in the queue, and RAN scheduler 305 may instead drop (delete) these incoming packets. Therefore, full queues may have the undesirable affect of packet loss, and this packet loss may have a negative impact on the performance of WCD applications.

Moreover, WCD application performance can be negatively impacted even if a queue is not completely full. Suppose that a wireless network operator has contractually promised each WCD user a data rate of 400 kilobits per second. Suppose further than the maximum forward link data rate on a given carrier frequency is 1200 kilobits per second. Thus, ideally, no more than three WCDs on the given carrier frequency should be simultaneously receiving data. If four or more WCDs on the given carrier frequency are simultaneously receiving data, then at least one (and perhaps all) of these WCDs will not receive their contractual 400 kilobits per second.

These examples demonstrate that merely balancing the total number of WCDs per carrier frequency can have undesirable consequences. Thus, the embodiments herein involve assigning WCDs to carrier frequencies based on a "slot contention" metric associated with each carrier frequency. Slot contention may be defined as the number of WCDs served by a given carrier frequency that are in an active state, and that are awaiting at least one packet held in the carrier frequency's queue.

Alternatively, but not represented in the figures, a given carrier frequency could support multiple forward link channels, and the RAN could support a separate queue for each forward link channel supported by the given carrier frequency. In such an embodiment, the slot contention metric could be calculated per queue or across all queues supported by the given carrier frequency.

Some wireless technologies, such as CDMA, support WCDs switching between active and dormant states to conserve both wireless resources (e.g., forward link and reverse link capacity) and WCD battery life. A dormant WCD typically is not involved in an ongoing communication session. Thus, forward link slots are not assigned to dormant WCDs. In contrast, an active WCD can be involved in one or more ongoing communication sessions, and therefore may be assigned forward link slots during at least part the time that it is active. A WCD typically switches back and forth between dormant and active states one or more times during the WCD's association with a RAN.

Thus, for example, a given carrier frequency may serve x WCDs, but only y of these WCDs may be active at a given point in time. Furthermore, out of the y active WCDs, only z WCDs may also be awaiting at least one packet that is held in the carrier frequency's queue. Accordingly, the slot contention metric for the given carrier frequency may be determined to be z. The relationship between these variables may be that y is less than or equal to x, and that z is less than or equal to y. For instance, in FIG. 3A, the slot contention metrics (denoted as "SC") associated with carrier frequencies 1, 2, and 3, are 6, 1, and 1, respectively. Thus, even when the total number of WCDs per carrier frequency is balanced, the slot contention metrics per frequency may be substantially unbalanced.

A RAN may perform load balancing across carrier frequencies based on at least this slot contention metric. In doing so, the RAN may be able to more effectively balance load between carrier frequencies. One way in which the RAN may effectuate such load balancing is when it initially assigns a WCD to a carrier frequency. Turning momentarily back to FIG. 2, if a WCD comes within the range of BTS 210, then the RAN may assign the WCD to one of carrier frequencies F1, F2, F3, or F4. It is desirable for the RAN to make this assignment so that the slot contention metrics on these carrier frequencies are roughly balanced. Thus, for example, the RAN may measure slot contention metrics for carrier frequencies F1, F2, F3, and F4, and assign the WCD to the carrier frequency with the lowest slot contention metric.

The RAN may follow the same process for any scenario in which the RAN assigns a WCD to a carrier frequency. This includes, but is not limited to, situations when a WCD is turned on or initialized within one or more of the RAN's coverage areas, when a WCD transitions from the dormant state to the active state within one or more of the RAN's coverage areas, or when a WCD is handed off to one or more of the RAN's coverage areas.

Figure 3B:
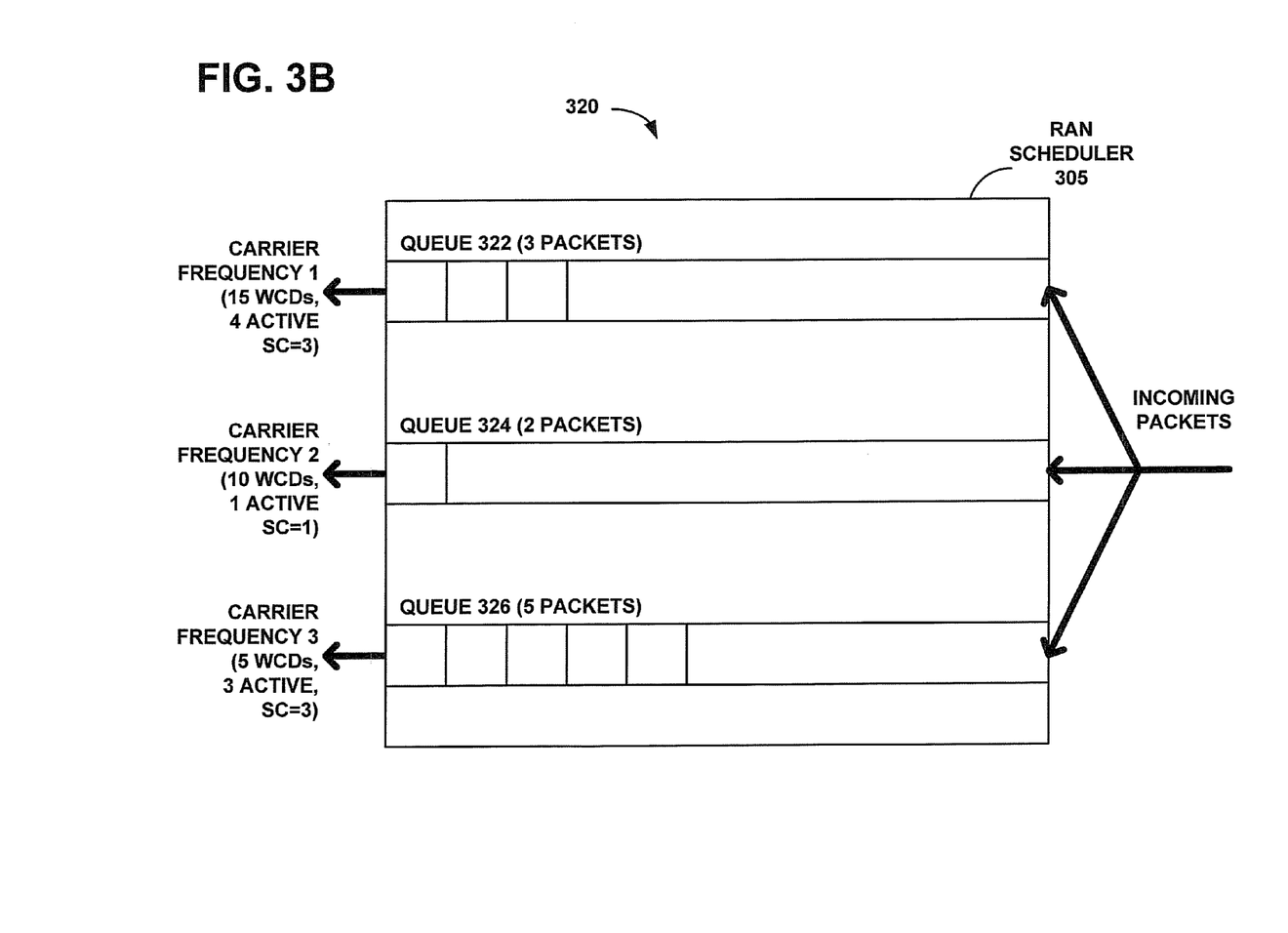

Turning to FIG. 3B, block diagram 320 illustrates RAN scheduler 305 arranged to balance load based on slot contention metrics associated with the three carrier frequencies. In FIG. 3B, carrier frequency 1 serves 15 WCDs, carrier frequency 2 serves 10 WCDs, and carrier frequency 3 serves 5 WCDs. However, carrier frequencies 1 and 3 each exhibit a slot contention of 3, while carrier frequency 2 exhibits a slot contention of 1. Accordingly, the lengths of queues 322, 324, and 326 are substantially more balanced than the corresponding queues in FIG. 3A. Thus, FIG. 3B illustrates the premise that balancing WCDs across carrier frequencies based on slot contention may lead to substantially balanced queues associated with the carrier frequencies.

Note that a slot contention metric need not be based on a single measurement or sample. In other words, slot contention can be based on calculations involving multiple measurements over time. For example, slot contention can be measured periodically (e.g., once per second) and slot contention metrics can be reported as a rolling average of the last n slot contention measurements. Of course, other periods of measurement and other calculations may be used instead.

In addition to using a slot contention metric to assign WCDs to carrier frequencies, a slot contention metric can also be used to determine when to perform other carrier frequency management functions. For instance, measurements of slot contention can be used to determine when carrier frequencies can be taken out of service. In situations where the slot contention metrics for all carrier frequencies in a particular physical or geographic area is sufficiently low (e.g., below a first threshold), the RAN may take one or more of these carrier frequencies out of service. Doing so may conserve power and wireless network management overhead.

Figure 3C:
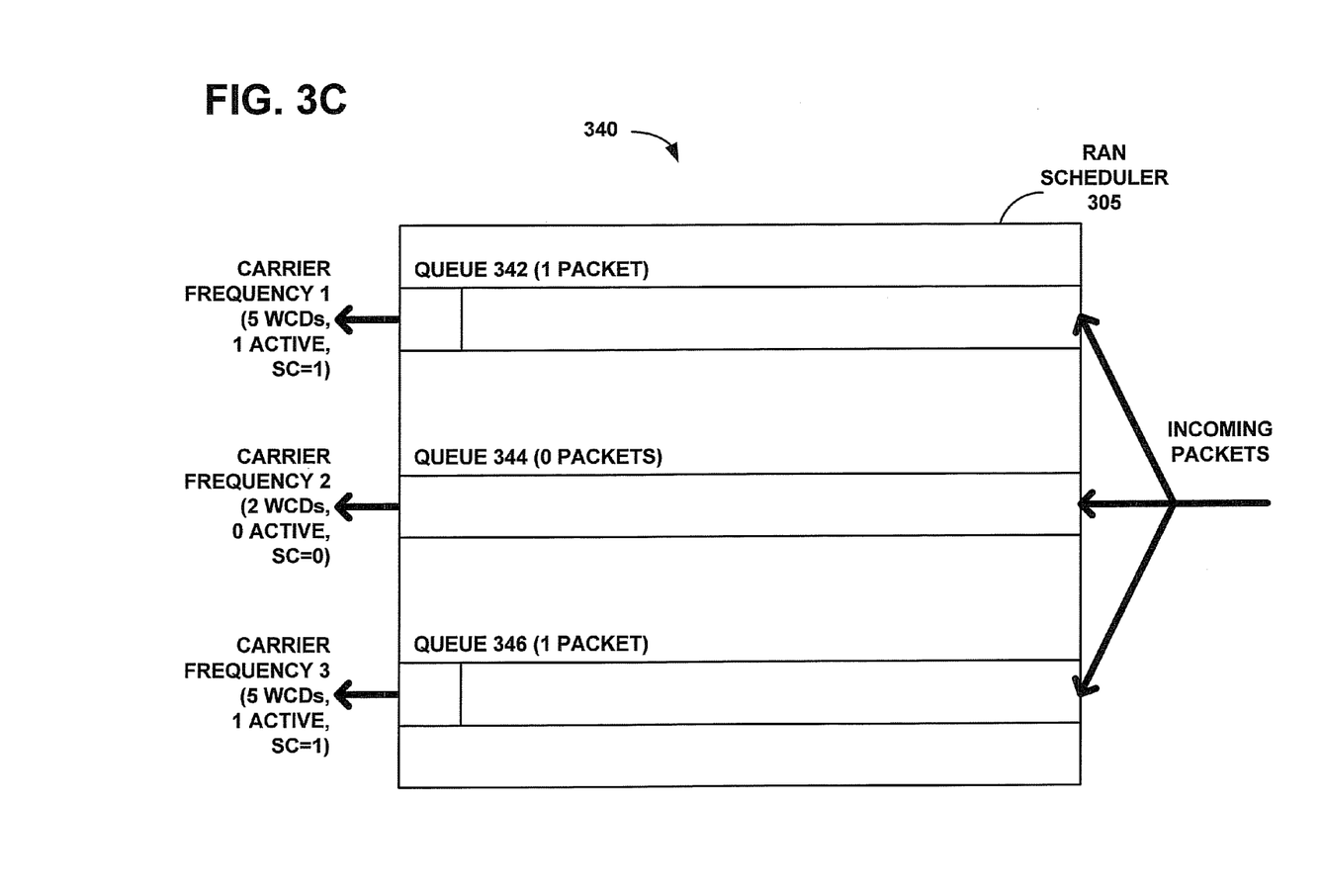

FIG. 3C illustrates block diagram 340, in which scheduler 305 is arranged to balance load based on slot contention metrics associated with three carrier frequencies. There are 12 total WCDs associated with the carrier frequencies, but only 2 of these WCDs are active. Accordingly, there is only 1 packet in queue 342, 1 packet in queue 346, and queue 344 is empty. Queues 342 and 346 each have a slot contention of 1, while queue 344 has a slot contention of 0. In this low-traffic scenario, the RAN may determine that the slot contention metrics of these carrier frequencies are all below the first threshold. As a result of this determination, the RAN may take one or more carrier frequencies out of service. For instance, the RAN may take carrier frequency 2 out of service, because carrier frequency 2 is not serving any active WCDs.

Conversely, a slot contention metric can also be used to determine when additional carrier frequencies should be placed in service. In situations where the slot contention metrics for all carrier frequencies in a particular physical or geographic area is sufficiently high (e.g., above a second threshold), the RAN may place one or more new carrier frequencies in service. Doing so may reduce congestion in the RAN, and may make it more likely that the RAN will be able to deliver a particular level of service any given WCD.

Figure 3D:
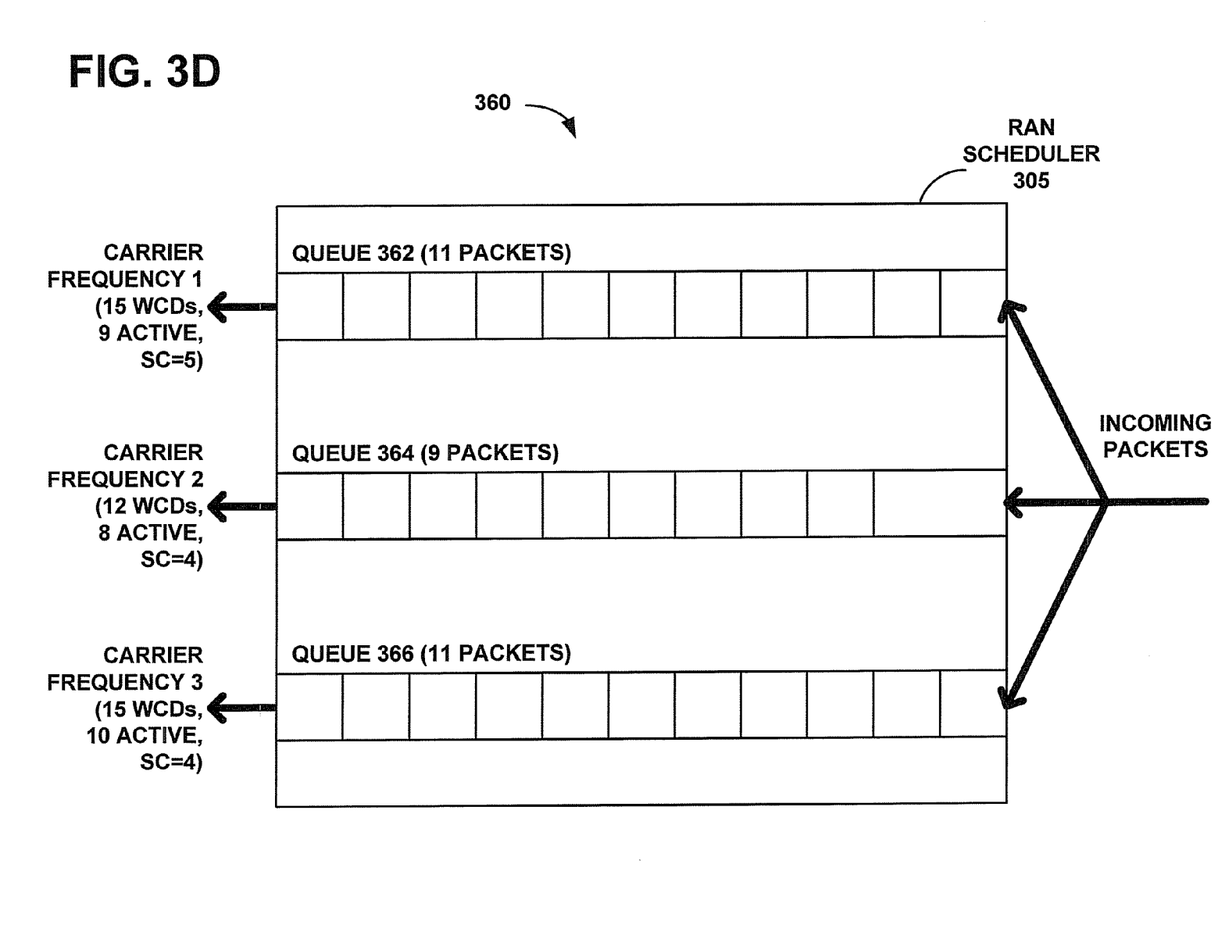

FIG. 3D illustrates block diagram 360, in which scheduler 305 is arranged to balance load based on slot contention metrics associated with three carrier frequencies. There are 42 total WCDs associated with the carrier frequencies, and 27 of these WCDs are active. Accordingly, queue 362 contains 11 packets, queue 364 contains 9 packets, and queue 366 contains 11 packets. The slot contention metrics associated with these queues are 5, 4, and 4, respectively. In this high-traffic scenario, the RAN may determine that the slot contention metrics of these carrier frequencies are all above a second threshold. As a result of this determination, the RAN may place at least one new carrier frequency in service. After doing so, the RAN may balance load across all of the carrier frequencies, new and old, so that the load on any one carrier frequency is less likely to be excessive. Thus the addition of the new carrier frequency may have the effect of reducing load on the other carrier frequencies.

It should be understood that the block diagrams illustrated by FIGS. 3A-3D are examples of RAN scheduler operation. An actual RAN may support more than three or fewer than three carrier frequencies. Furthermore, an actual RAN may also use more or fewer queues to hold packets. These queues may be physically or logically combined with one another, or may be physically or logically separate from each other. Additionally, these queues may be able to hold more than just 11 packets each. Additionally, an actual RAN may utilize more than one RAN scheduler, and these RAN schedulers may operate separately or in conjunction with one another to carry out forward link slot allocation procedures. Moreover, a RAN scheduler, such as RAN scheduler 305, may be a component of any type of RAN element or may be distributed across multiple RAN elements. Thus, for example, an access node, BTS, or some other RAN element may contain a RAN scheduler.

Not all RAN elements may be able to directly measure or report a forward link slot contention metric. Some access node or BTS vendors may implement such functionality in their equipment while others may not. However, when RAN elements cannot directly provide a forward link slot contention metric, the RAN may be able to estimate forward link slot contention from other RAN traffic characteristics.

For instance, there may be a correlation between reverse link activity on a carrier frequency and the forward link slot contention on that carrier frequency. Reverse link activity may be defined as the number of active WCDs assigned to a carrier frequency. However reverse link activity can be measured in other ways as well. In some wireless network technologies, such as CDMA, each active WCD may be assigned a unique medium access control identifier (MAC_ID). For example, in EVDO Rev. A, MAC_IDs comprise an integer between 0 and 127, with MAC_IDs 6-63 and 72-127 being available to be assigned to WCDs. A MAC_ID may serve as a dynamically assigned address for the each WCD. Thus, reverse link activity for a carrier frequency can also be measured by counting the number of MAC_IDs in use on the carrier frequency.

Figure 3E:
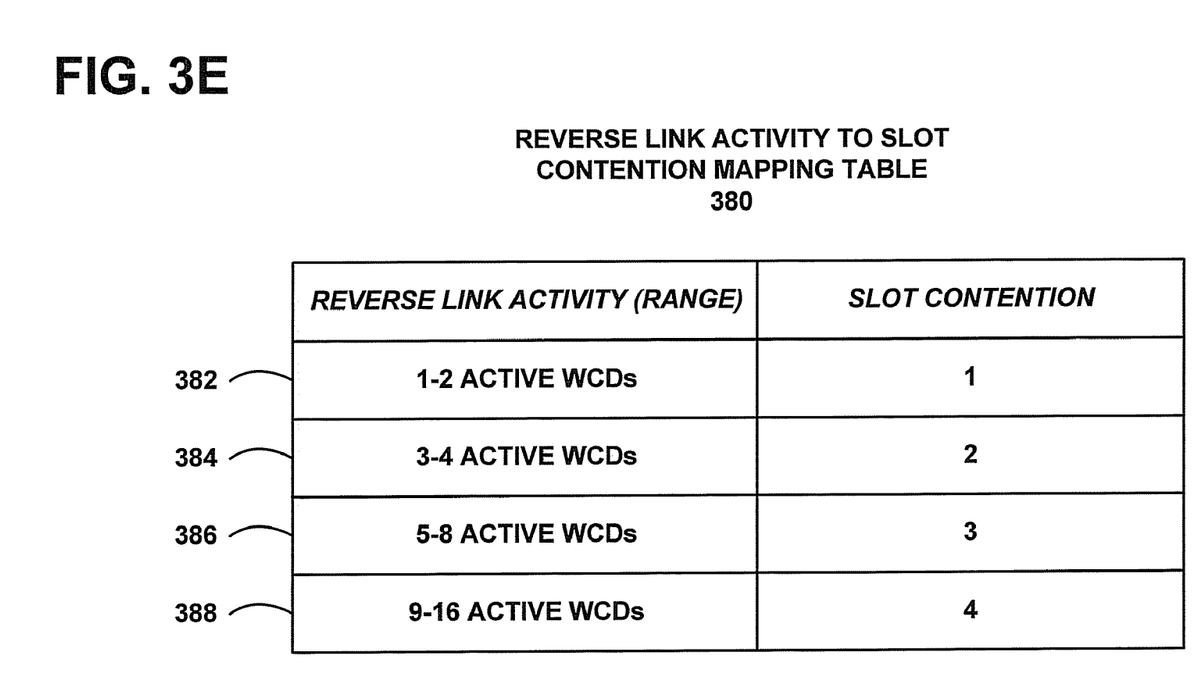
FIG. 3E depicts a table that maps between reverse link activity and slot contention in accordance with an example embodiment.

Regardless of how reverse link activity is determined, there may be a discernable relationship between reverse link activity and slot contention. FIG. 3E comprises table 380 that maps reverse link activity to slot contention. Table 380 comprises four entries, 382, 384, 386, and 388. Each entry maps a range of reverse link activity factors for a given carrier frequency (e.g., a number of active WCDs assigned to the carrier frequency) with an estimate of a slot contention metric for the given carrier frequency. For instance, entry 384 maps a reverse link activity of 3-4 active WCDs to a slot contention metric of 2.

Table 380 can be provisioned based on observed correlations between reverse link activity and slot contention. For example, if a RAN element provides measurements of a slot contention metric, these measurements can be sampled along with measurements of reverse link activity. Preferably, a large volume of such measurements may be taken, thereby allowing the development of correlations between reverse link activity and slot contention, so that a mapping such as table 380 can also be developed. Then, these correlations can be applied to RAN elements that provide reverse link activity factors but not slot contention metrics. It is expected that most vendors of RAN elements will report measurements of some form of reverse link activity. Therefore, by using mappings based on correlations between reverse link activity factors and slot contention metrics, slot contention metrics can be made available for RAN elements that do not report slot contention metrics directly.

Note that in table 380, as the reverse link activity increases, so does the slot contention metric. This reflects the understanding that as more active WCDs are assigned to a carrier frequency, there will be more network traffic (e.g., packets) contending for forward link slots on the carrier frequency. However, other relationships between reverse link activity factors and slot contention metrics are possible.

Furthermore, table 380 may contain more than just four entries. For instance, table 380 may also contain entries for extents of tens, hundreds, or thousands of active WCDs. Additionally, the values of the slot contention metrics may be different than those appearing in table 380. Moreover, these values need not be static; instead, they can be updated from time to time by a RAN element (such as a BTS or an access node).

A table, such as table 380, may be stored within the RAN element. Additionally, a separate table may be configurable for each wireless coverage area. This would provide the ability for an operator of the RAN to configure different mappings for different BTSs, access nodes, and/or carrier frequencies.

III. EXAMPLE METHODS

Figure 4:
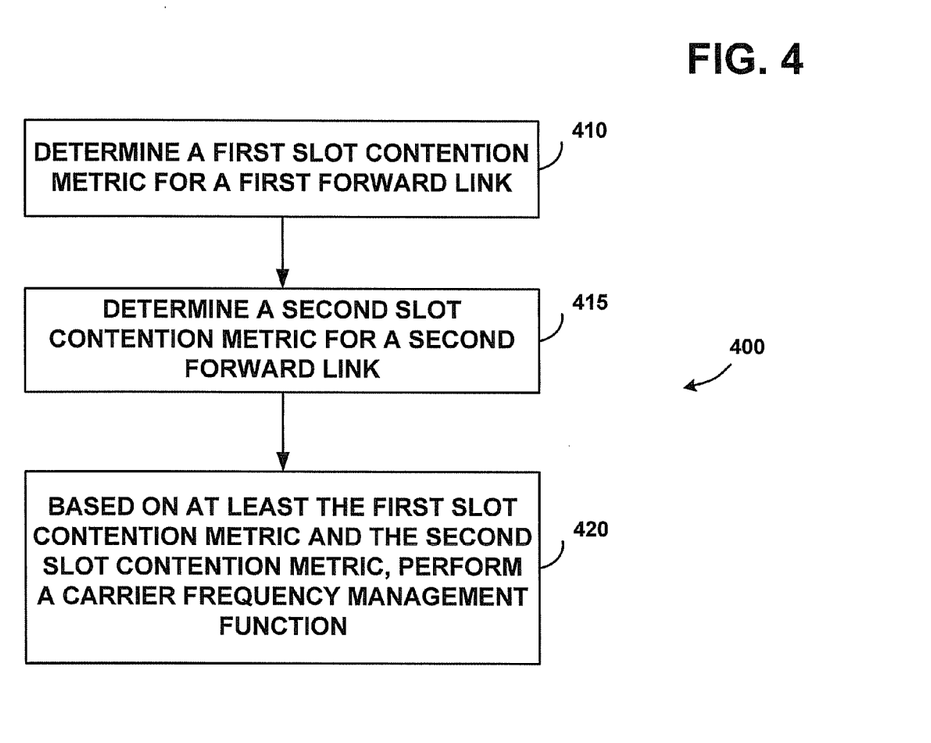
FIG. 4 is a flow chart in accordance with an example embodiment.
Figure 5:
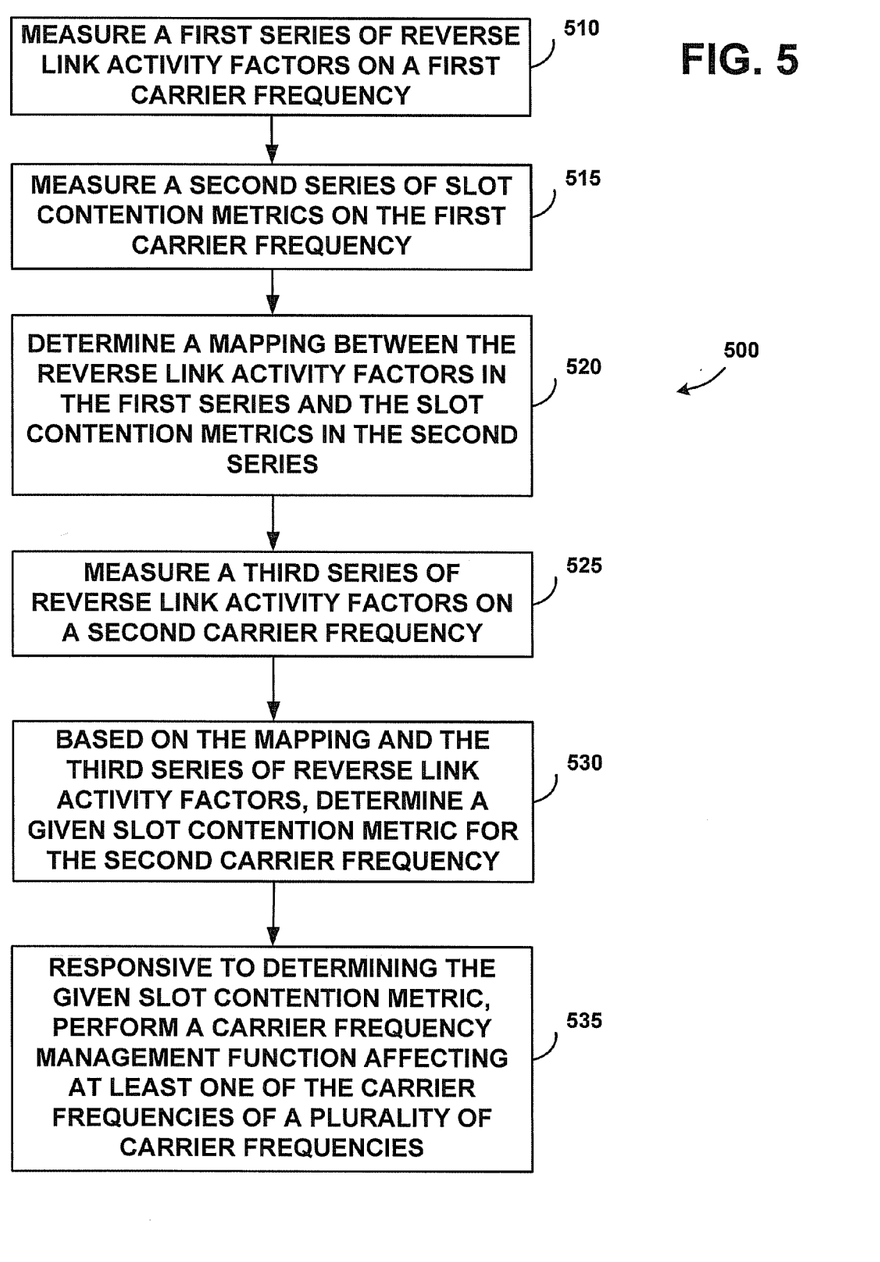
FIG. 5 is another flow chart in accordance with an example embodiment.

FIGS. 4 and 5 depict example methods in accordance with preferred embodiments. These methods may be carried out by one or more RAN elements such as, but not limited to, access nodes and/or BTSs. FIG. 4 is a flow chart 400 depicting performance of a carrier frequency management function based on slot contention measurements. At step 410, a first slot contention metric for a first forward link is determined, where the first forward link is associated with a first carrier frequency. Similarly, at step 415, a second slot contention metric for a second forward link is determined, where the second forward link is associated with a second carrier frequency. Preferably, the first and second slot contention metrics are based on the number of active WCDs that (1) are assigned to the first and second forward link, respectively, and (2) are awaiting at least one data packet that is queued in the RAN.

At step 420, based at least on the first slot contention metric and the second slot contention metric, a carrier frequency management function is performed. The carrier frequency management function may include assigning a WCD to a carrier frequency, removing a carrier frequency from service, placing a new carrier frequency in service, or may take still other forms. Thus, the carrier frequency management function may operate on the first carrier frequency, the second carrier frequency, and/or carrier frequencies other than the first and second carrier frequencies.

If the carrier frequency management function involves assigning a WCD to a carrier frequency, then the carrier frequency management function may include comparing the first slot contention metric to the second slot contention metric. If the first slot contention metric is lower than the second slot contention metric, then the carrier frequency management function may also include assigning the WCD to the first carrier frequency after receiving a request to establish a session from the WCD. The session may be a new session or may be a session that is handed off from a different wireless coverage area (e.g., a different carrier frequency).

Alternatively, the RAN may determine that both the first and the second slot contention metrics are below a first threshold value. In this case, the carrier management function may include taking either the first or the second carrier frequency out of service in order to save power and wireless resources. On the other hand, the RAN may determine that both the first and the second slot contention metrics are above a second threshold value. Accordingly, the carrier frequency management function may include the RAN beginning to radiate on a third carrier frequency in order to provide service to WCDs on the third carrier frequency.

Additionally, slot contention metrics may be determined based on a corresponding reverse link activity factors, such as the number of active WCDs per carrier frequency. For example, a first reverse link activity factor for a first reverse link may be determined, where the first reverse link is associated with the first carrier frequency. Correlation data between the first reverse link activity factor and the first slot contention metric may be saved in the form of a table mapping reverse link activity factors to slot contention metrics. Then, based on the correlation data and a fourth reverse link activity factor measured for a fourth reverse link that is associated with a fourth carrier frequency, a third slot contention metric for the fourth carrier frequency may be determined.

FIG. 5 is another flow chart 500 depicting performance of a carrier frequency management function based on slot contention measurements, where the slot contention metrics are determined from measured reverse link activity factors. A RAN may radiate on a plurality of carrier frequencies to define wireless coverage areas. At step 510, a first series of reverse link activity factors for a first carrier frequency of the plurality are measured. These reverse link activity factors may be based on the number of active WCDs assigned to the first carrier frequency when the measurements are taken. For example, the number of MAC_IDs in use on the first carrier frequency could be counted to determine the number of active WCDs. At step 515, a second series of slot contention metrics for the first carrier frequency are measured. Then, at step 520, a mapping between the reverse link activity factors measured in the first series and the slot contention metrics measured in the second series is determined.

At step 525, a third series of reverse link activity factors for a second carrier frequency of the plurality are measured. At step 530, based on the mapping and this third series, a given slot contention metric for the second carrier frequency is determined. At 535, responsive to determining the given slot contention metric, a carrier frequency management function affecting at least one of the plurality of carrier frequencies is performed. This carrier frequency management function may include at least one of: (i) removing at least one carrier frequency from service, (ii) the RAN beginning to radiate on at least one new carrier frequency, and (iii) assigning a session from a WCD to at least one of the carrier frequencies of the plurality of carrier frequencies.

It should be understood that the sequences of steps or events depicted in flow charts 400 and 500 may occur in a different order, and fewer or more steps or events may occur without departing from the scope of the embodiments. Moreover, the methods depicted in these flow charts may be combined with one another wholly or in part, to form additional embodiments that are also within the scope of this invention.

IV. EXAMPLE RAN ELEMENT

Figure 6:
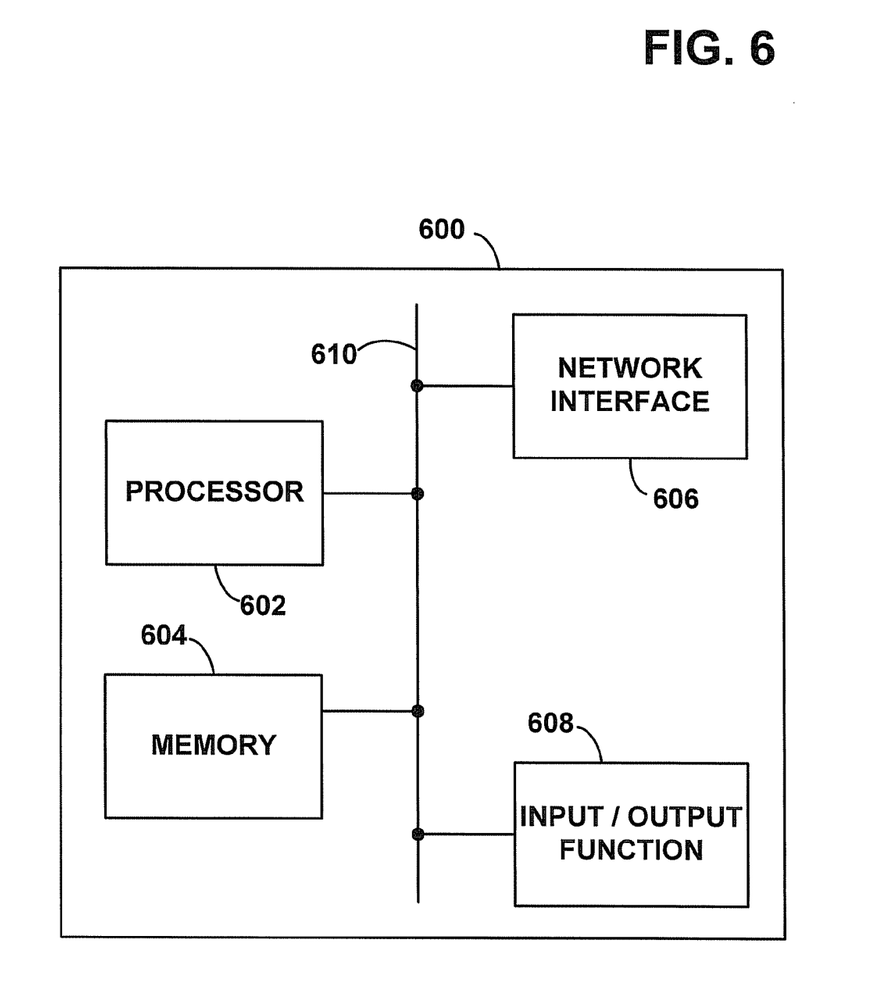
FIG. 6 is a block diagram of a RAN element in accordance with an example embodiment.

FIG. 6 is a simplified block diagram depicting example RAN element 600. RAN element 600 may be an access node, a BTS or some other entity or group of entities that perform RAN functions. FIG. 6 illustrates some of the functional components that would likely be found in a RAN element arranged to operate in accordance with the embodiments herein. Example RAN element 600 preferably includes a processor 602, a memory 604, a network interface 606, and an input/output function 608, all of which may be coupled by a system bus 610 or a similar mechanism.

Processor 602 preferably includes one or more CPUs, such as one or more general purpose processors and/or one or more dedicated processors (e.g., application specific integrated circuits (ASICs) or digital signal processors (DSPs), etc.)

Memory 604, in turn, may comprise volatile and/or non-volatile memory and can be integrated in whole or in part with processor 602. Memory 604 preferably holds program instructions executable by processor 602, and data that is manipulated by these instructions, to carry out various functions described herein. Alternatively, the functions can be defined by hardware, firmware, and/or any combination of hardware, firmware and software.

Network interface 606 may take the form of a wireline connection, such as an Ethernet, Token Ring, SONET, or T-carrier connection. Network interface 606 may also take the form of a wireless connection, such as IEEE 802.11, BLUETOOTH®, CDMA, WIMAX®, UMTS®, LTE®, or any other interface used to communicate with WCDs. However, other forms of physical layer connections and other types of standard or proprietary communication protocols may be used over network interface 606. Furthermore, network interface 606 may comprise multiple physical or logical network interfaces, each capable of operating according to the same or different protocols.

Input/output function 608 facilitates user interaction with example RAN element 600. Input/output function 608 may comprise multiple types of input devices, such as a keyboard, a mouse, a touch screen, and so on. Similarly, input/output function 608 may comprise multiple types of output devices, such as a monitor, printer, or one or more light emitting diodes (LEDs). Additionally or alternatively, example RAN element 600 may support remote access from another device, via network interface 606 or via another interface (not shown), such an RS-232 port.

By way of example, the data in memory 604 may contain information associated with performing any of the methods, processes, or functions described herein. For example, memory 604 may contain a representation of one or more WCDs, including information related to these WCDs, such as various types of identifiers, and/or forward-link capacity factor(s) associated with the WCD. Furthermore, memory 604 may contain a representation of one or more carrier frequencies that RAN element 600 may use to define wireless coverage areas. This representation may include a forward-link capacity factor associated with each wireless coverage area. Memory 604 may also contain program instructions that are executable by processor 602 to perform any of the methods, processes, or functions presented herein or represented by any of the accompanying figures.

V. CONCLUSION

Exemplary embodiments have been described above. Those skilled in the art will understand, however, that changes and modifications may be made to these embodiments without departing from the true scope and spirit of the invention, which is defined by the claims.

What is claimed is:

1. A method for performing a carrier frequency management function at a radio access network (RAN), wherein the RAN radiates on a first carrier frequency to define a first forward link, wherein the RAN radiates on a second carrier frequency to define a second forward link, wherein the RAN is capable of serving wireless communication devices (WCDs) with the first forward link and the second forward link, wherein the first forward link and the second forward link both operate in accordance with time-division multiplexing (TDM), whereby each of the first forward link and the second forward link is divided into TDM slots, wherein the RAN transmits data to at least one WCD during each forward link TDM slot, and wherein each WCD served by the RAN is in a state selected from the group consisting of an idle state and an active state, the method comprising:
the RAN determining a first slot contention metric for the first forward link, wherein determining the first slot contention metric comprises determining a number of WCDs that are (i) served by the first carrier frequency, (ii) in the active state, and (iii) awaiting packets queued in the RAN and destined to at least one of the number of WCDs;
the RAN determining a second slot contention metric for the second forward link; and
based at least on the first slot contention metric and the second slot contention metric, the RAN performing the carrier frequency management function, wherein the carrier frequency management function comprises a function chosen from the group consisting of (i) assigning a WCD to one of the first carrier frequency and the second carrier frequency, (ii) taking one of the first carrier frequency and the second carrier frequency out of service, and (iii) the placing a third carrier frequency in service.

2. The method of claim 1, further comprising:
the RAN receiving a request to establish a session from the WCD;
the RAN comparing the first slot contention metric to the second slot contention metric, wherein the outcome of the comparison is that the first slot contention metric is lower than the second slot contention metric, and wherein the carrier frequency management function comprises the RAN assigning the WCD to the first carrier frequency.

3. The method of claim 2, wherein the session is a new session.

4. The method of claim 2, wherein the session is being handed off from a different wireless coverage area.

5. The method of claim 1, further comprising:
the RAN determining that the first slot contention metric is less than a first threshold value; and
the RAN determining that the second slot contention metric is less than the first threshold value, wherein the carrier frequency management function comprises the RAN taking the first carrier frequency out of service.

6. The method of claim 1, further comprising:
the RAN determining that the first slot contention metric is greater than a second threshold value; and
the RAN determining that the second slot contention metric is greater than the second threshold value, wherein the carrier frequency management function comprises the RAN beginning to radiate on the third carrier frequency, thereby providing service to WCDs on the third carrier frequency.

7. The method of claim 1, wherein the first slot contention metric is updated periodically.

8. The method of claim 1, wherein the RAN determining the first slot contention metric comprises the RAN determining the first slot contention metric based on a corresponding first reverse link activity factor, and wherein the RAN determining the second slot contention metric comprises the RAN determining the second slot contention metric based on a corresponding second reverse link activity factor.

9. The method of claim 1, wherein the RAN radiates on a fourth carrier frequency to define a fourth forward link that operates in accordance with TDM, whereby the fourth forward link is divided into slots, and wherein the RAN includes a fourth reverse link associated with the fourth carrier frequency, the method further comprising:
the RAN measuring a first reverse link activity factor on a first reverse link, wherein the first reverse link is associated with the first carrier frequency;
the RAN storing correlation data between the first reverse link activity factor and the first slot contention metric;
the RAN measuring a second reverse link activity factor for the fourth reverse link; and
the RAN determining a third slot contention metric for the fourth wireless coverage area based on at least the second reverse link activity factor and the correlation data.

10. A method, performed by a radio access network (RAN), wherein the RAN radiates on a plurality of carrier frequencies, wherein each carrier frequency is associated with a forward link and a reverse link, wherein the RAN is capable of serving wireless communication devices (WCDs) with each carrier frequency, wherein each forward link operates in accordance with time-division multiplexing (TDM), whereby each forward link is divided into TDM slots, and wherein the RAN transmits data to at least one WCD during each forward link TDM slot, the method comprising:
the RAN measuring a first series of reverse link activity factors on a first carrier frequency;
the RAN measuring a second series of slot contention metrics on the first carrier frequency;
the RAN determining a mapping between the measured reverse link activity factors in the first series and the measured slot contention metrics in the second series;
the RAN measuring a third series of reverse link activity factors on a second carrier frequency;
based on the mapping and the third series of reverse link activity factors, the RAN determining a given slot contention metric for the second carrier frequency; and
responsive to determining the given slot contention metric, the RAN performing a carrier frequency management function affecting at least one of the carrier frequencies of the plurality of carrier frequencies.

11. The method of claim 10, wherein each measured reverse link activity in the first series of measured reverse link activities comprises a number of active WCDs assigned to the first carrier frequency.

12. The method of claim 10, wherein each measured reverse link activity in the first series of measured reverse link activities comprises a number of medium access control identifiers (MAC_IDs) in use on the first carrier frequency.

13. The method of claim 10, wherein the carrier frequency management function is based at least on the given slot contention metric, and wherein the carrier frequency management function comprises at least one of: (i) the RAN removing at least one of the carrier frequencies of the plurality of carrier frequencies from service, (ii) the RAN beginning to radiate on at least one new carrier frequency, thereby adding the at least one new carrier frequency to the plurality of carrier frequencies, and (iii) the RAN assigning a session from a WCD to at least one of the carrier frequencies of the plurality of carrier frequencies.

14. A radio access network (RAN) comprising:
at least one base transceiver system (BTS), radiating on a first carrier frequency, wherein the first carrier frequency is associated with a first forward link and a first reverse link, and the at least one BTS radiating on a second carrier frequency, wherein the second carrier frequency is associated with a second forward link and a second reverse link;
a processor, capable of executing program instructions; and
a memory, containing a mapping between measured reverse link activity factors and forward link slot contention factors, wherein the memory also contains program instructions, executable by the processor, to (i) measure a first reverse link activity factor for the first reverse link, (ii) measure a second reverse link activity factor for the second reverse link, (iii) determine, based on the first reverse link activity factor and the mapping, a first slot contention factor for the first forward link, (iv) determine, based on the second reverse link activity factor and the mapping, a second slot contention factor for the second forward link, (v) based on the first slot contention factor and the second slot contention factor, select one of the first carrier frequency and the second carrier frequency, and (vi) assign a new session from a wireless communication device (WCD) to the selected carrier frequency.

15. The RAN of claim 14, wherein the memory also contains program instructions, executable by the processor, to, based on the first slot contention factor and the second slot contention factor, direct the BTS to take at least one of the first carrier frequency and the second carrier frequency out of service.

16. The RAN of claim 14, wherein the memory also contains program instructions, executable by the processor, to, based on the first slot contention factor and the second slot contention factor, direct the BTS to radiate on a third carrier frequency to define a third wireless coverage area.

17. The RAN of claim 14, wherein RAN serves at least one WCD via the first carrier frequency and at least one WCD via the second carrier frequency, wherein each WCD served by the RAN is in a state selected from the group consisting of an idle state and an active state, wherein the first slot reverse link activity factor is based on a number of WCDs served by the first carrier frequency that are in an active state, and wherein the second reverse link activity factor is based on a number of WCDs served by the second carrier frequency that are in the active state.

18. The RAN of claim 14, wherein the mapping is based on historical data, collected by the RAN, that correlates measured reverse link activity factors to measured forward link slot contention factors.

19. The RAN of claim 14, wherein each of the first reverse link activity factor and the second reverse link activity factor is based on at least one of (i) a number of WCDs using a given reverse link, and (ii) a number of medium access control identifiers (MAC_IDs) in use on the given reverse link.

20. A method for placing a carrier frequency in service for a radio access network (RAN), wherein the RAN radiates on a first carrier frequency to define a first forward link, wherein the RAN is capable of serving wireless communication devices (WCDs) with the first forward link, wherein the first forward link operates in accordance with time-division multiplexing (TDM), whereby the first forward link is divided into TDM slots, wherein the RAN transmits data to at least one WCD during each forward link TDM slot, and wherein each WCD served by the RAN is in a state selected from the group consisting of an idle state and an active state, the method comprising:

the RAN determining a slot contention metric for the first forward link, wherein determining the slot contention metric comprises determining a number of WCDs that are (i) served by the first carrier frequency, (ii) in the active state, and (iii) awaiting packets queued in the RAN and destined to at least one of the number of WCDs;

the RAN determining that the slot contention metric is higher than a threshold value;

based at least on the determination that the slot contention metric is higher than the threshold value, the RAN beginning to radiate on a second carrier frequency to define a second wireless coverage area, whereby the second carrier frequency is capable of providing service to WCDs via the second wireless coverage area.

\* \* \* \* \*